(12) United States Patent
Xiao et al.

(10) Patent No.: US 9,343,736 B2
(45) Date of Patent: May 17, 2016

(54) LITHIUM COMPENSATION FOR FULL CELL OPERATION

(71) Applicant: Battelle Memorial Institute, Richland, WA (US)

(72) Inventors: Jie Xiao, Richland, WA (US); Jianming Zheng, Richland, WA (US); Xilin Chen, Richland, WA (US); Dongping Lu, Richland, WA (US); Jun Liu, Richland, WA (US); Jiguang Zhang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 205 days.

(21) Appl. No.: 14/231,058

(22) Filed: Mar. 31, 2014

(65) Prior Publication Data

US 2015/0280228 A1   Oct. 1, 2015

(51) Int. Cl.
| | |
|---|---|
| *H01M 8/22* | (2006.01) |
| *H01M 4/38* | (2006.01) |
| *H01M 4/04* | (2006.01) |
| *H01M 4/505* | (2010.01) |
| *H01M 4/525* | (2010.01) |
| *H01M 10/42* | (2006.01) |
| *H01M 4/02* | (2006.01) |

(52) U.S. Cl.
CPC .............. *H01M 4/382* (2013.01); *H01M 4/04* (2013.01); *H01M 4/505* (2013.01); *H01M 4/525* (2013.01); *H01M 10/4235* (2013.01); *H01M 2004/027* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,335,115 B1 * | 1/2002 | Meissner | 429/117 |
| 2004/0175621 A1 * | 9/2004 | Iriyama et al. | 429/231.95 |
| 2004/0258997 A1 * | 12/2004 | Utsugi et al. | 429/232 |
| 2007/0224502 A1 * | 9/2007 | Affinito et al. | 429/209 |
| 2008/0050644 A1 * | 2/2008 | Christensen et al. | 429/50 |
| 2012/0107680 A1 | 5/2012 | Amiruddin et al. | |
| 2012/0141876 A1 | 6/2012 | Ryu et al. | |
| 2012/0300366 A1 | 11/2012 | Cho et al. | |
| 2013/0045427 A1 | 2/2013 | Zhamu et al. | |
| 2013/0071729 A1 | 3/2013 | Klaassen | |
| 2013/0260246 A1 | 10/2013 | Chen et al. | |

FOREIGN PATENT DOCUMENTS

WO   WO2013/165767 A1   7/2013

* cited by examiner

*Primary Examiner* — Patrick Ryan
*Assistant Examiner* — Jose Colucci Rios
(74) *Attorney, Agent, or Firm* — Klarquist Sparkman, LLP (57) ABSTRACT

Disclosed herein are embodiments of a lithium-ion battery system comprising an anode, an anode current collector, and a layer of lithium metal in contact with the current collector, but not in contact with the anode. The lithium compensation layer dissolves into the electrolyte to compensate for the loss of lithium ions during usage of the full cell. The specific placement of the lithium compensation layer, such that there is no direct physical contact between the lithium compensation layer and the anode, provides certain advantages.

18 Claims, 9 Drawing Sheets

LITHIUM COMPENSATION FOR FULL CELL OPERATION

ACKNOWLEDGMENT OF GOVERNMENT SUPPORT

This invention was made with government support under DE-AC05-76RL01830 awarded by the U.S. Department of Energy. The government has certain rights in the invention.

FIELD

Disclosed herein are embodiments of a device comprising lithium metal for compensation of lithium loss.

SUMMARY

Disclosed herein are embodiments of a device comprising a lithium compensation layer for lithium compensation. One disclosed embodiment concerns a device comprising a lithium battery full cell comprising a cathode, a separator, an anode current collector comprising a first surface and a second surface, an anode, and a lithium compensation layer located on, and in direct physical contact with, the first surface of the anode current collector, where there is an absence of direct physical contact between the lithium compensation layer and the anode.

In some embodiments, the anode is located on, and is in direct physical contact with, the second surface of the anode current collector. In some embodiments, there is a complete absence of direct physical contact between the lithium compensation layer and the second surface of the anode current collector.

In some embodiments, the lithium compensation layer is lithium foil, and in other embodiments, the lithium compensation layer is a deposited lithium compensation layer. The lithium compensation layer may have a mass value selected to substantially compensate for lithium ion loss during use of the device.

In some embodiments, the anode comprises graphite, $Li_4Ti_5O_{12}$, silicon, tin, tin alloy, silicon alloy, silicon oxide, lithium alloy, tin oxide, zinc oxide, iron oxide, cobalt oxide, nickel oxide, germanium, graphene, activated carbon, carbon nanotubes, silicon/boron carbide/graphite composite, or combinations thereof. In some embodiments, the anode is a high-capacity silicon anode.

In some embodiments, the cathode is a high-voltage cathode, and may comprise $LiNiO_2$, $LiNi_{1/3}Co_{1/3}Mn_{1/3}O_2$, $LiNi_{0.5}Mn_{1.5}O_4$, $LiNi_{0.5-x}Cr_xMn_{1.5}O_4$, $LiNi_{0.5-x}Co_xMn_{1.5}O_4$, $LiNi_{0.5-x}Al_xMn_{1.5}O_4$, $LiNi_{0.5}Fe_xMn_{1.5}O_4$, $LiNi_{0.5}Mn_{1.5}O_{4-z}F_z$ or combinations thereof, where x is from greater than 0 to less than 0.5, and z is from 0 to less than 4.

Another disclosed embodiment concerns a device comprising a lithium battery full cell, comprising a high-voltage cathode, a separator, an anode current collector comprising a first surface and a second surface, a lithium compensation layer in direct physical contact with the first surface of the anode current collector, and an anode in direct physical contact with the second surface of the anode current collector, and not in direct physical contact with the lithium compensation layer.

A third disclosed embodiment discloses a device comprising a lithium battery full cell comprising an anode current collector having a first surface and a second surface, a lithium compensation layer in direct physical contact with the first surface of the anode current collector, and an anode in direct physical contact with the second surface of the anode current collector, and not in direct physical contact with the lithium compensation layer.

The foregoing and other objects, features, and advantages of the invention will become more apparent from the following detailed description, which proceeds with reference to the accompanying figures.

DETAILED DESCRIPTION

The following explanations of terms are provided to better describe the present disclosure and to guide those of ordinary skill in the art in the practice of the present disclosure. As used herein, "comprising" means "including" and the singular forms "a" or an or "the" include plural references unless the context clearly dictates otherwise. The term or refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Anode: An electrode through which electric charge flows into a polarized electrical device during the charging process. From an electrochemical point of view, negatively-charged anions move away from the anode and/or positively-charged cations move toward it to balance the electrons arriving from external circuitry. In a discharging battery, such as the disclosed lithium-ion batteries or a galvanic cell, the anode is the negative terminal where electrons flow out. If the anode is composed of a metal, electrons that it gives up to the external circuit are accompanied by metal cations moving away from the electrode and into the electrolyte. Exemplary anode active materials include, but are not limited to, graphite, silicon, silicon alloy, and tin alloy.

Cathode: An electrode through which electric charge flows out of a polarized electrical device during the charging process. From an electrochemical point of view, positively charged cations invariably move away from the cathode and/or negatively charged anions move toward it to balance the electrons arriving from external circuitry. In a discharging battery, such as the disclosed lithium-ion batteries or a galvanic cell, the cathode is the positive terminal, which receives electrons from the external circuit.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Current collector: A battery component that conducts the flow of electrons between an electrode and a battery terminal. The current collector also may provide mechanical support for the electrode's active material, such as an anode's active material. Exemplary current collectors include, but are not limited to, copper foil, aluminum foil, copper mesh and aluminum mesh.

Electrolyte: A substance containing free ions that behaves as an electrically conductive medium. Electrolytes generally comprise ions in a solution, but molten electrolytes and solid electrolytes also are known.

High-voltage cathode: A cathode assembly comprising a cathode that enables a cell to have an operating voltage of greater than 4.4 V. An example of a high-voltage cathode is $LiMn_{1.5}Ni_{0.5}O_4$.

High-capacity silicon anode: An anode having a capacity greater than that of a graphite anode, i.e. greater than 372 mAh/g. In some embodiments, a high-capacity silicon anode has a capacity of from greater than 372 mAh/g to 4200 mAh/g. An example of a high-capacity silicon anode, is an anode comprising silicon nanowires.

Lithium foil: A lithium metal sheet having a thickness of from greater than 0 to 1 mm, such as from greater than 0 to 0.8 mm, from greater than 0 to 0.6 mm, from greater than 0 to 0.4 mm or from greater than 0 to 0.2 mm. In some embodiments, the lithium foil comprises, consists essentially of or consists of substantially pure lithium metal.

In advanced lithium-ion batteries in which a high-voltage cathode, a high-capacity silicon anode, or both are used, a large amount of $Li^+$ ions are irreversibly consumed during charge/discharge cycles. Without being bound to a particular theory, this irreversible loss of $Li^+$ ions may be due to the formation of passivation film on both the cathode (if charged to above 4.4 V) and anode. If a silicon anode is used, silicon oxide on the surface also needs to react with a certain amount of $Li^+$ ions. If too many $Li^+$ ions are irreversibly consumed, the utilization rate of active materials will be reduced and the cell capacity will be lowered.

To compensate for the irreversible consumption of $Li^+$ ions, additional lithium can be added to the cell. One method of achieving this is to at least partially pre-lithiate the anode, such as by placing a layer comprising lithium powder or lithium metal on the anode. In this configuration, possibly due to the contact between the lithium and anode, the compensation begins substantially immediately upon contact with the electrolyte. However, with the compensation starting substantially immediately not all of the lithium at the anode surface can diffuse into the anode, due to lithium ion diffusion coefficients. Excess lithium at the anode surface can facilitate lithium dendrite formation, which reduces battery systems cycle life and causes safety concerns for battery system use. Additionally, lithium powder is expensive and the solvents used to disperse lithium powder are typically toxic. Also, the lack of uniformity of a lithium compensation layer resulting from dispersion of lithium powder can be a concern. Therefore, there is a need for an inexpensive, less toxic, and more consistent source of lithium ions for lithium compensation, especially for use in high-voltage cell.

Figure 1:
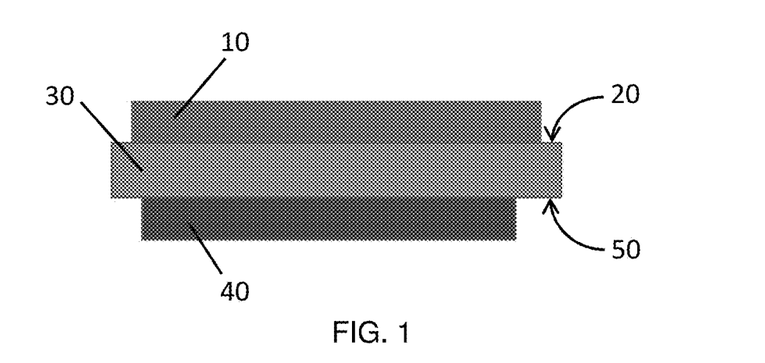
FIG. 1 is a schematic representation of an exemplary anode assembly with a lithium compensation layer in direct physical contact with the anode current collector and not in direct physical (immediate) contact with the anode.
Figure 2:
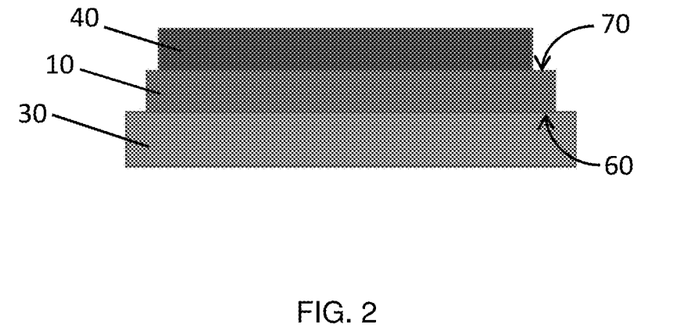
FIG. 2 is a schematic representation of an exemplary anode assembly with a lithium compensation layer in direct physical (immediate physical contact) contact with the anode.

During research for technology development, the inventors were investigating solutions to problems faced with lithium compensation in lithium-ion batteries. The initial test was designed to use an anode assembly comprising a strip of lithium metal foil as a lithium compensation layer. The anode assembly was to comprise a current collector in direct physical contact with an anode, with the anode also in direct physical contact with the lithium compensation layer. However, in the process of assembling the anode assembly, the lithium foil strip was mistakenly placed on the opposite surface of the current collector from the anode. Therefore, the lithium compensation layer was not in direct, physical contact with the anode. FIG. 1 schematically describes the arrangement of the components in this anode assembly. With reference to FIG. 1, the anode 10 is in direct physical contact with a first surface 20 of the current collector 30, and the lithium compensation layer 40 is in direct physical contact with a second surface 50 of the current collector, and not in direct physical contact with the anode 10. FIG. 2 schematically describes an anode assembly with the lithium compensation layer 40 in direct physical contact with the anode. With reference to FIG. 2, a first surface 60 of the anode 10 is in direct physical contact with the current collector 30 and the lithium compensation layer 40 is in direct physical contact with a second surface 70 of the anode 10.

Figure 3:
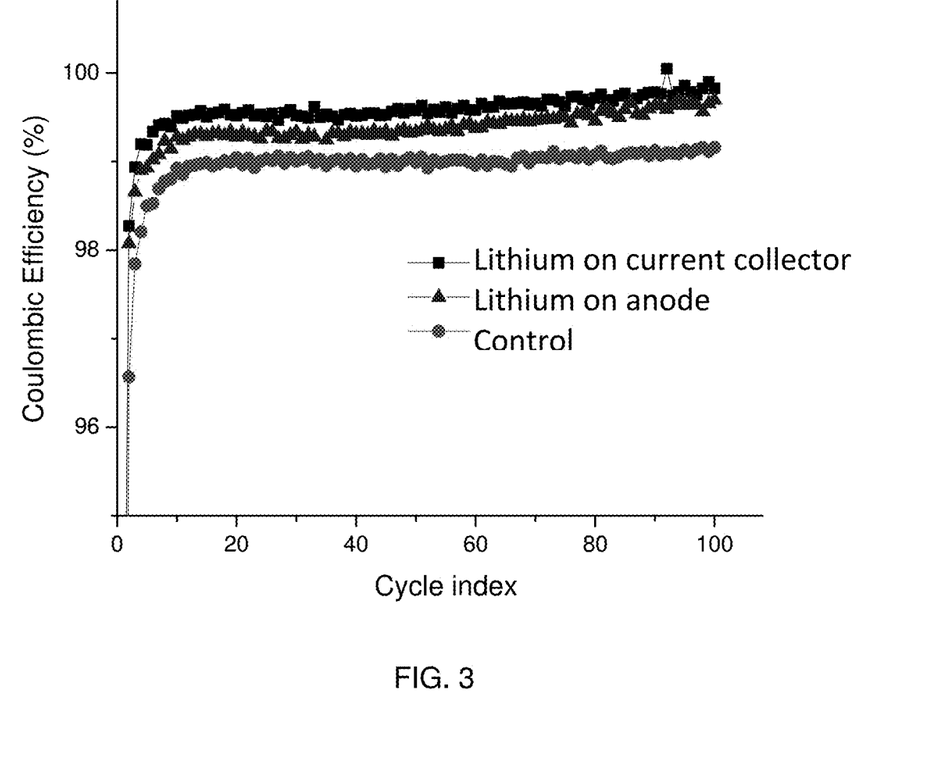
FIG. 3 is a graph of Coulombic efficiency versus cycle index, comparing the relative Coulombic efficiencies for full cells comprising the anode assemblies from FIGS. 1 and 2, and a full cell with a non-lithiated anode assembly.

Surprisingly, the cell comprising the anode assembly from FIG. 1 had superior results as compared to a cell comprising the anode assembly illustrated FIG. 2, and to a control cell comprising a traditional, non-prelithiated anode assembly (FIG. 3). Without being bound to a particular theory, the surprisingly superior results may be due to the lithium compensation not beginning substantially immediately when the electrode contacts the electrolyte, but happening electrochemically when the cell is in use. Additionally, a uniform layer of lithium on the current collector, such as from a piece of lithium foil or a lithium layer deposited on the surface of the current collector, may allow the lithium metal to dissolve evenly into the electrolyte, thereby substantially preventing local variations in the concentration of lithium ions.

Figure 4:
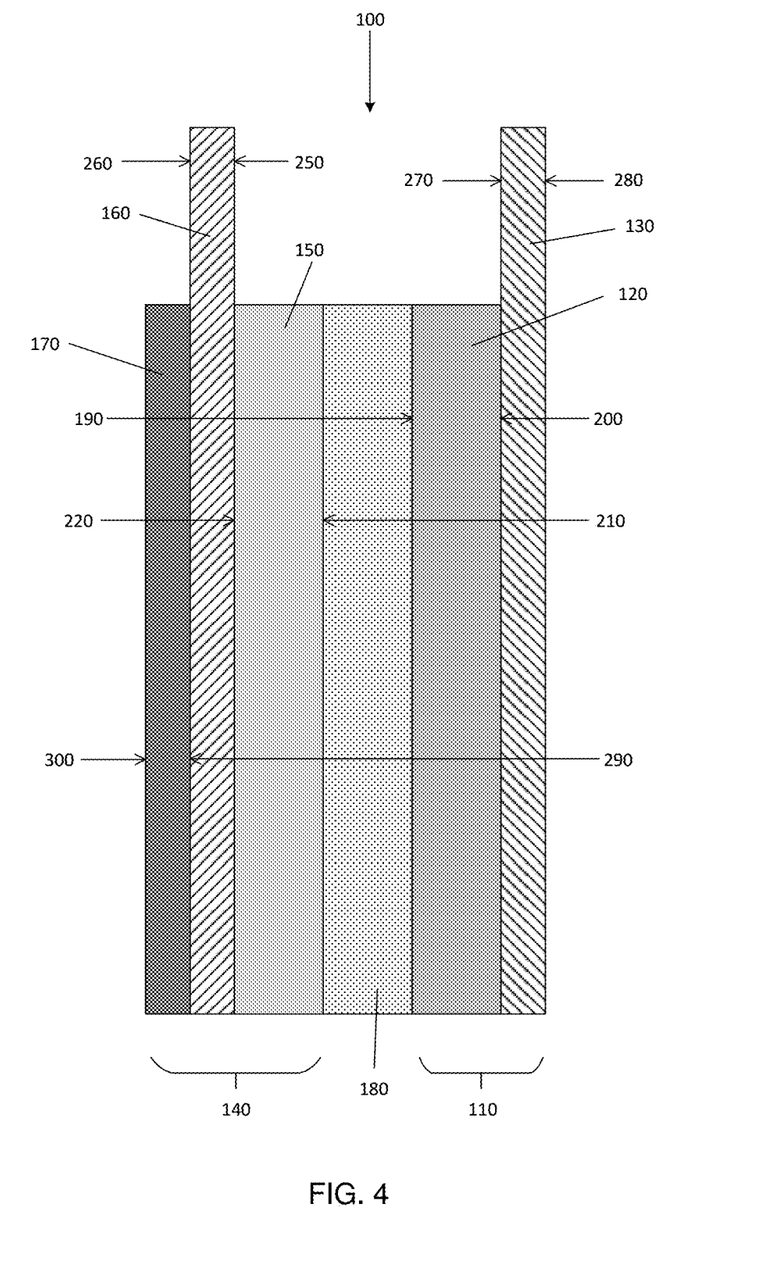
FIG. 4 is a schematic diagram of a full cell according to one of the disclosed embodiments.

Disclosed herein are embodiments of a device comprising a lithium compensation layer for lithium compensation during cycling of a lithium battery system, including lithium-ion battery systems, lithium air battery systems, lithium sulfur battery systems, and battery systems that need pre-lithiated graphite, silicon, silicon oxide, tin or tin oxide as the anode. FIG. 4 is a schematic diagram of one embodiment of such a device.

With reference to FIG. 4, a lithium battery cell 100 comprises or consists essentially of or consists of a cathode assembly 110 comprising or consisting essentially of or consisting of a cathode 120 and a cathode current collector 130, an anode assembly 140 comprising or consisting essentially of or consisting of an anode 150, an anode current collector 160 and a lithium compensation layer 170, a separator 180 between a first surface 190 of the cathode 120 and a first surface 210 of the anode 150, and in certain embodiments, an electrolyte (usually absorbed within the porous separator and the porous electrodes).

In certain embodiments of the disclosed lithium-ion battery system, the cathode 120 is made from a suitable electrically conductive material. The cathode 120 may comprise materials into which and from which lithium ions intercalate and de-intercalate. Suitable materials include, but are not limited to, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M_x(PO_4)_3$ (M=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ or $M^{C2}$=Fe, Mn, Ni, Co, Cr, Ti, Mg, Al; 0≤x≤1), $LiM^{C1}_xM^{C2}_yM^{C3}_{1-x-y}O_2$ (($M^{C1}$, $M^{C2}$, or $M^{C3}$=Fe, Mn, Ni, Co, Cr, Ti, Mg, or Al; 0≤x≤1; 0≤y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3 \cdot (1-x)LiM^{C1}_yM^{C2}_zM^{C3}_{1-y-z}O_2$ ($M^{C1}$, $M^{C2}$, or $M^{C3}$=Mn, Ni, Co, Cr, Fe, or mixture of; x=0.3-0.5; y≤0.5; z≤0.5), $Li_2MSiO_4$ (M=Mn, Fe, or Co), $Li_2MSO_4$ (M=Mn, Fe, or Co), $LiMSO_4F$ (Fe, Mn, or Co), $Li_{2-x}(Fe_{1-y}Mn_y)P_2O_7$ (0≤y≤1), $Cr_3O_8$, $Cr_2O_5$, lithium cobalt oxide ($LiCoO_2$), $LiMn_2O_4$, or $LiFePO_4$ or combinations thereof, and high-voltage cathode materials such as $LiNiO_2$, $LiNi_{1/3}Co_{1/3}Mn_{1/3}O_2$, $LiNi_{0.5}Mn_{1.5}O_4$, $LiNi_{0.5-x}Cr_xMn_{1.5}O_4$, $LiNi_{0.5-x}Co_xMn_{1.5}O_4$, $LiNi_{0.5-x}Al_xMn_{1.5}O_4$, $LiNi_{0.5-x}Fe_xMn_{1.5}O_4$, $LiNi_{0.5}Mn_{1.5}O_{4-z}F_z$ or combinations thereof, where x is from greater than 0 to less than 0.5, and z is from 0 to less than 4. These are alternative embodiments, not necessarily equivalent materials as to performance. In some embodiments, the cathode has a thickness of from 10 μm to 100 μm, and in some embodiments, the cathode has a capacity of from 0.5 to 3 mAh/cm².

In certain embodiments of the disclosed lithium-ion battery system, the cathode current collector 130 is in contact with or is in direct physical contact with the cathode 120. The cathode current collector 130 may comprise any suitable electrically conductive material. In some embodiments, the cathode current collector 130 comprises a metal or metal alloy, such as aluminum or copper. The cathode current collector 130 may comprise a metal foil, or a grid such as a mesh grid, an expanded metal grid, a photochemically etched grid, or the like.

Figure 5:
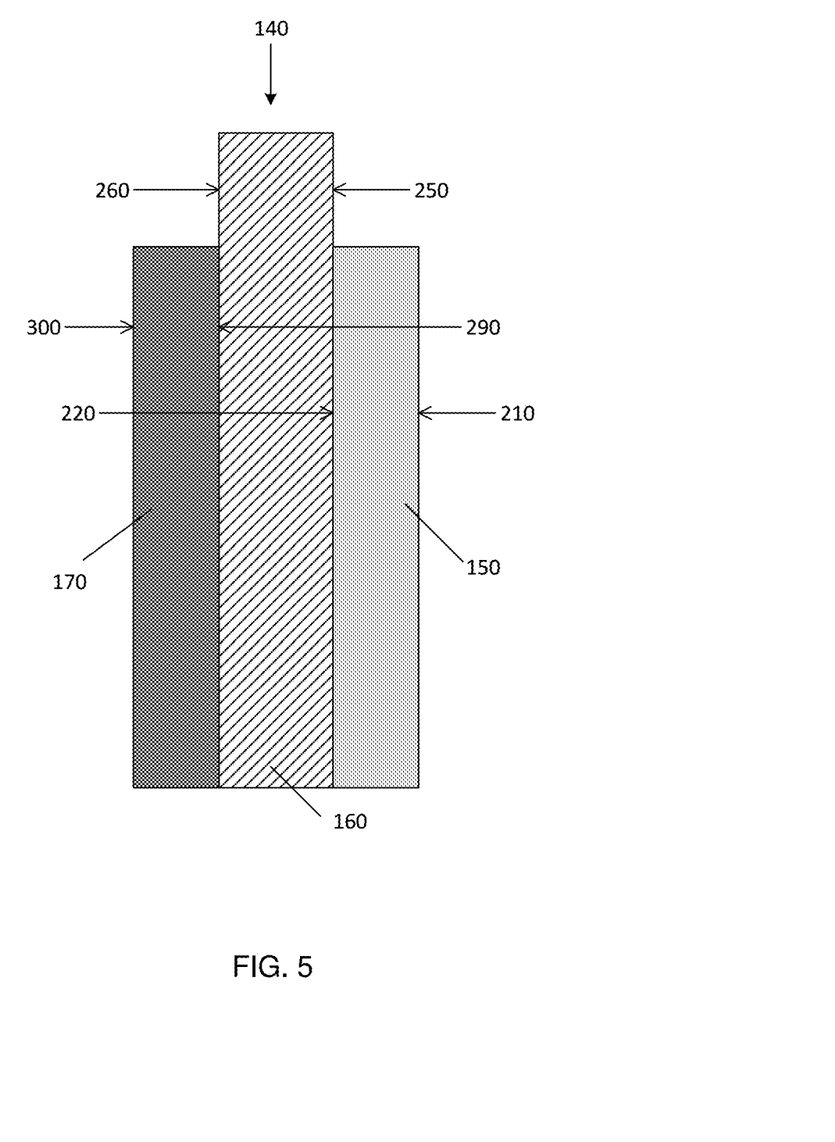
FIG. 5 is a schematic diagram of an anode assembly according to one of the disclosed embodiments, with the lithium compensation layer on a first surface of the anode current collector and the anode on a second surface of the current collector, and not in direct physical contact with the lithium compensation layer.

In some embodiments, the anode assembly 140 comprises or consists essentially of or consists of an anode 150, an anode current collector 160 and a lithium compensation layer 170 (see also FIG. 5). In certain embodiments of the disclosed lithium-ion battery system, the anode 150 comprises a suitable electronically conductive material. The anode 150 is a material into which and from which lithium ions intercalate and de-intercalate. Suitable materials include, but are not limited to, graphite, $Li_4Ti_5O_{12}$, silicon, silicon alloys, silicon oxide, tin, tin alloys, lithium alloys, metal oxides, such as tin oxide, zinc oxide, iron oxide, manganese oxide, cobalt oxide, nickel oxide, vanadium oxide or titanium oxide, germanium, graphene, active carbon, composites such as silicon/carbon or silicon/boron carbide (B4C)/graphite, carbon nanotubes or combinations thereof. These are alternative embodiments, not necessarily equivalent materials as to performance. In some embodiments, anodes comprise silicon/carbon or Si/B4C/graphite composite.

The size and shape of the anode may depend on the intended use. For example, in batteries of a coin-cell type, the anode typically is a disc shape and may have a diameter of, for example, from 1 to 2 cm, such as from 1.4 to 1.6 cm. For use in batteries of a pouch-type cell, the anode typically is a square or rectangular shape, and may have dimensions of, for example, 4 cm×4 cm or 4 cm×6 cm. In some embodiments, the anode may be substantially flat, such as in coin-cell type, and in other embodiments, it may be rolled or coiled, such as in a cylindrical cell. In some embodiments, the anode has a thickness of from 10 μm to 100 μm.

FIG. 5 is a schematic drawing of an exemplary anode assembly 140 according to disclosed embodiments. With reference to FIG. 5, the anode current collector 160 comprises a first surface 250 and a second surface 260. In certain embodiments of the disclosed lithium-ion battery system, the first surface 250 of the anode current collector 160 is in direct physical contact with a second surface 220 of the anode 150, the second surface 260 of the anode current collector 160 is in direct physical contact with a first surface 290 of the lithium compensation layer 170, and there is no direct, physical contact between the anode 150 and the lithium compensation layer 170.

The anode current collector 160 may comprise a suitable electrically conductive material. In some embodiments, the anode current collector may comprise a metal or metal alloy, such as aluminum or copper. The anode current collector 160 may be metal foil or a grid such as a mesh grid, an expanded metal grid, a photochemically etched grid, or the like. In certain embodiments the anode current collector comprises copper foil.

In certain embodiments of the disclosed lithium-ion battery system, the lithium compensation layer 170 is in direct physical contact with the second surface 260 of the anode current collector 160 but placed such that there is no direct physical contact between the lithium compensation layer 170 and the anode 150. In some embodiments, the lithium compensation layer 170 is in direct physical contact with the second surface 260 of the anode current collector and not in direct physical contact with the first surface 250 (FIG. 5).

The lithium compensation layer 170 may comprise any suitable source of lithium metal. In some embodiments, the lithium compensation layer comprises or consists essentially of or consists of a strip of lithium metal, such as lithium foil, lithium metal sheet or a lithium metal mesh or grid. In some embodiments, the strip of lithium metal comprises, consists essentially of or consists of substantially pure lithium metal. In other embodiments, the lithium compensation layer 170 comprises lithium deposited in a layer on the second surface 260 of the anode current collector 160. In some embodiments, the layer of deposited lithium metal comprises, consists essentially of or consists of substantially pure lithium metal. This is an alternative to lithium foil but is not being indicated as being an equivalent as it may perform differently in certain embodiments as compared to a lithium foil or lithium metal strip.

A suitable method of deposition may be used to deposit the lithium metal onto the current collector, such as electrochemical plating, chemical solution deposition, spin coating, chemical vapor deposition (CVD), physical vapor deposition (PVD), atomic layer deposition, thermal evaporation, electron beam evaporation, molecular beam epitaxy, sputtering (DC, rf, magnetron), pulsed laser deposition, cathode arc deposition, electrohydrodynamic deposition, atmospheric pressure CVD (APCVD), low-pressure CVD (LPCVD), ultrahigh vacuum CVD (UHVCVD), microwave assisted CVD (MACVD), plasma-enhanced CVD (PECVD) or metal-organic CVD (MOCVD), closed space sublimation (CSS), closed spaced vapor transport (CSVT), liquid deposition, ink-jet deposition, slot die coating, or capillary coating, or a combination thereof.

In certain embodiments where the current collector comprises a mesh or grid, the lithium compensation layer comprises or consists essentially of or consists of a strip of lithium metal, such as a piece of lithium foil, lithium metal sheet or a lithium metal mesh or grid.

The mass of the lithium compensation layer 170 is selected to provide sufficient lithium to compensate for the lithium loss during the first few cycles. In some embodiments, sufficient lithium is provided such that the lithium compensation layer 170 is substantially consumed while compensating for the lithium loss and in other embodiments, an excess of lithium is provided. However, in some embodiments where an excess of lithium is presented, the excess lithium may be deposited on the anode and form lithium dendrite during initial cycling of a battery system.

In certain embodiments wherein the current collector comprises at least a first surface and a second surface, it also comprises one or more edges between the first and second surfaces. In some embodiments, the anode at least partially covers the first surface of the anode current collector, or may cover substantially all or all of the first surface of the anode current collector. In some embodiments, the lithium compensation layer at least partially covers the second surface of the anode current collector, or may cover substantially all or all of the second surface of the anode current collector. In certain embodiments, the edges of the current collector are substantially free from direct physical contact with either the anode or the lithium compensation layer. Alternatively, the anode, the lithium compensation layer, or both, may at least partially, or substantially completely, cover one or more of the edges of the current collector. However, in such embodiments, there is preferably an absence of direct, physical contact between the anode and the lithium compensation layer. This is not to indicate that absence or presence of direct physical contact are equivalents.

With reference to FIG. 4, in some embodiments the separator 180 is between the cathode assembly 110 and the anode assembly 140. In some embodiments, the separator 180 is in direct physical contact with the first surface 190 of the cathode 120 and the first surface 210 of the anode 150. The separator 180 is a suitable material that allows the electrolyte comprising lithium ions to flow from the cathode 120 to the anode 150 and vice versa. The separator 180 is a suitable size to prevent the cathode assembly 110 from directly or physically contacting with the anode assembly 140, and of a suitable thickness to allow ion flow. Suitable materials for the separator 180 include, but are not limited to, polymeric materials including copolymers such as polypropylene/polyethylene copolymer or other polyolefin multilayer laminate that includes micropores.

In certain embodiments of the disclosed lithium-ion battery system, the electrolyte is provided between the cathode assembly 110 and the anode assembly 140 to provide a medium through which the lithium ions may travel. The electrolyte may be partially or substantially completely or completely absorbed within the porous separator and/or the porous electrodes. The electrolyte is also in direct physical contact with the lithium compensation layer. In some embodiments, the electrolyte is a liquid, such as a non-aqueous solution of one or more suitable lithium salts dissolved in a suitable solvent. Suitable lithium salts include, but are not limited to, $LiPF_6$, $LiBF_4$, $LiClO_4$ or combinations thereof. Solvents suitable to dissolve the lithium salts include, but are not limited to, ethylene carbonate (EC), propylene carbonate, dimethyl carbonate (DMC), ethyl methyl carbonate (EMC), or combinations thereof. In other embodiments, the electrolyte is a lithium salt dissolved in a polymeric material such as poly(ethylene oxide) or silicone. Alternatively, the electrolyte may be an ionic liquid such as N-methyl-N-alkylpyrrolidinium bis(trifluoromethanesulfonyl)imide salts. Sufficient lithium salts are dissolved in the solvent to provide a suitable concentration of lithium ions, such as from 0.5 to 2 moles/liter, typically, from 0.8 to 1.5 moles/liter. In some embodiments, the electrolyte comprises $LiPF_6$ dissolved in a 1:2 EC/DMC mixture at a concentration of 1 mole/liter.

EXAMPLES

Comparison of Lithiated Anode Assemblies with a Non-lithiated Anode Assembly

Full cells were assembled, with anode assemblies comprising a copper foil anode current collector, and a silicon/carbon composite anode, which was attached to one side of the current collector. The anode electrode sheet was prepared by casting a slurry of $Si/B_4C$/Graphite (SBG) composite, super P (SP) (Timcal), and carboxymethyl cellulose sodium salt (Na-CMC) (Kynar HSV900, from Arkema Inc.) solution (2.5 wt. %) in distilled water onto copper foil (All Foils, Inc.). The weight ratio of SBG, SP and Na-CMC was 7:1:2. After the solvent (water) was evaporated, the electrode sheet was die-cut into disks with a diameter of 1.27 cm and dried overnight under vacuum at 110° C.

Figure 6:
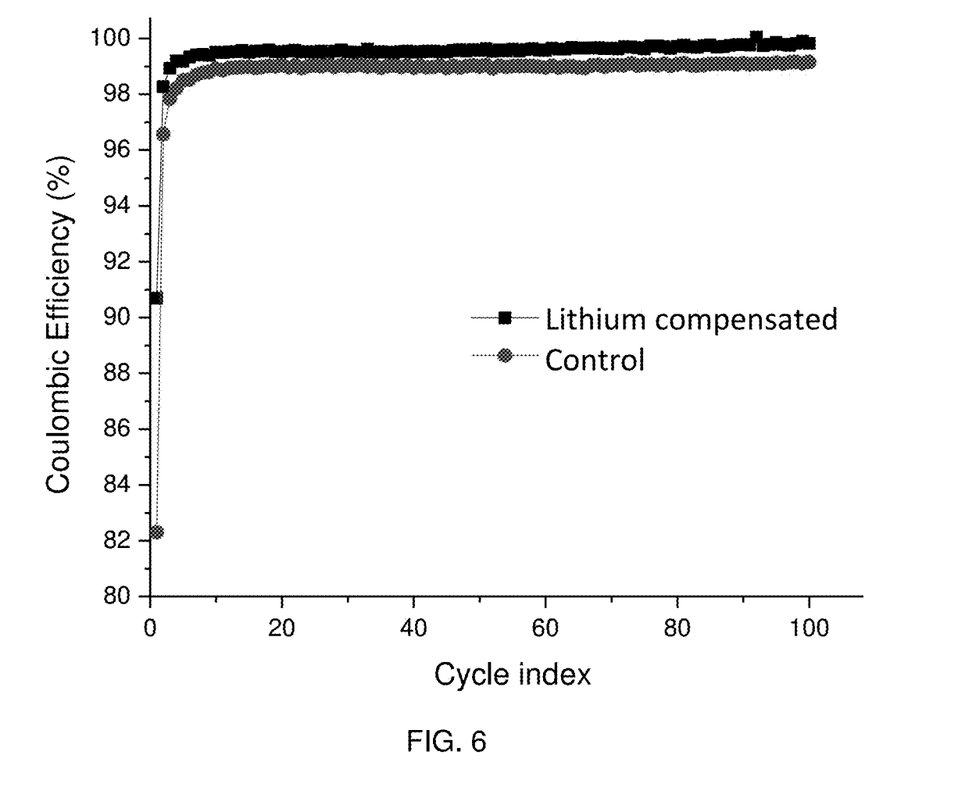
FIG. 6 is a graph of Coulombic efficiency versus cycle index, comparing the efficiencies of an exemplary full cell that has lithium compensation with a full cell that does not have lithium compensation.
Figure 7:
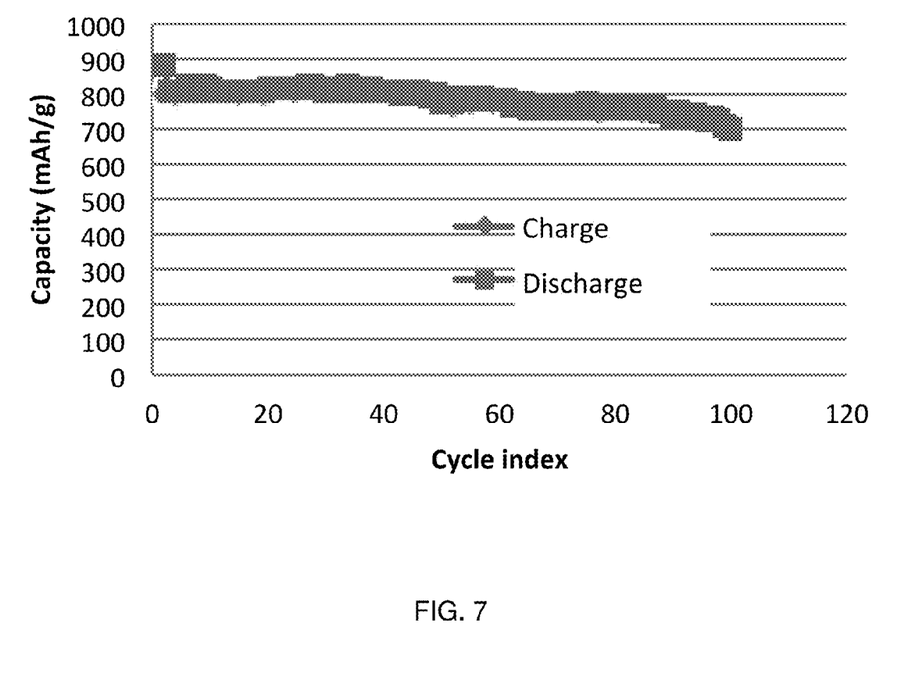
FIG. 7 is a graph of capacity versus cycle index, showing the capacity of an exemplary full cell with lithium compensation, over about 100 cycles.

Three cells were assembled in an argon-filled MBraun glove box using the above SBG electrode. One SBG anode assembly had a 2 mm×2 mm lithium metal sheet was pressed onto on the opposite surface of the anode current collector from the anode such that there was no direct, physical contact between the anode and the lithium metal sheet. Another anode assembly had a 2 mm×2 mm lithium metal sheet placed directly on top of the SBG electrode, and the third did not have a lithium metal sheet. In all three cells Li metal was used as the counter electrode, Celgard K1640 as the separator, and 1 M $LiPF_6$ in ethylene carbonate and dimethyl carbonate (1:2 ratio in volume) with 10 wt % fluoroethylene carbonate additive as the electrolyte. The electrochemical performance of the coin cells was measured at room temperature using a battery tester (Model BT-2000, Arbin Instruments). The cells were cycled between 0.02 and 1.5 V and the Coulombic efficiency was measured. As can be seen in FIG. 6, there was a large initial difference in Coulombic efficiency, between the cell with the lithium metal sheet on the back of the anode current collector and the cell with no lithium compensation (the control), with the cell with the pre-lithiated anode assembly having a greater efficiency. After about 100 cycles, the efficiency of both cells appeared to have achieved an equilibrium, but the cell with the pre-lithiated anode assembly still operated at a greater efficiency than the cell with the non-lithiated anode assembly. The capacity of the cell with the pre-lithiated anode assembly over the 100 cycles was also measured. As can be seen in FIG. 7, the cell capacity remained substantially the same after the initial charge-discharge cycle.

FIG. 3 illustrates the effect of the location of the lithium compensation layer. The cell with the lithium compensation layer (the lithium metal sheet) placed on directly the anode was not as efficient as the cell with the lithium compensation layer placed on the opposite surface of the current collector from the anode such that there was no direct physical contact between the lithium metal sheet and the anode, and both cells with the pre-lithiated anode assemblies were more efficient that the cell with no lithium compensation.

Comparing the Effect of Varying the Amount of Lithium Used for Compensation

Figure 8:
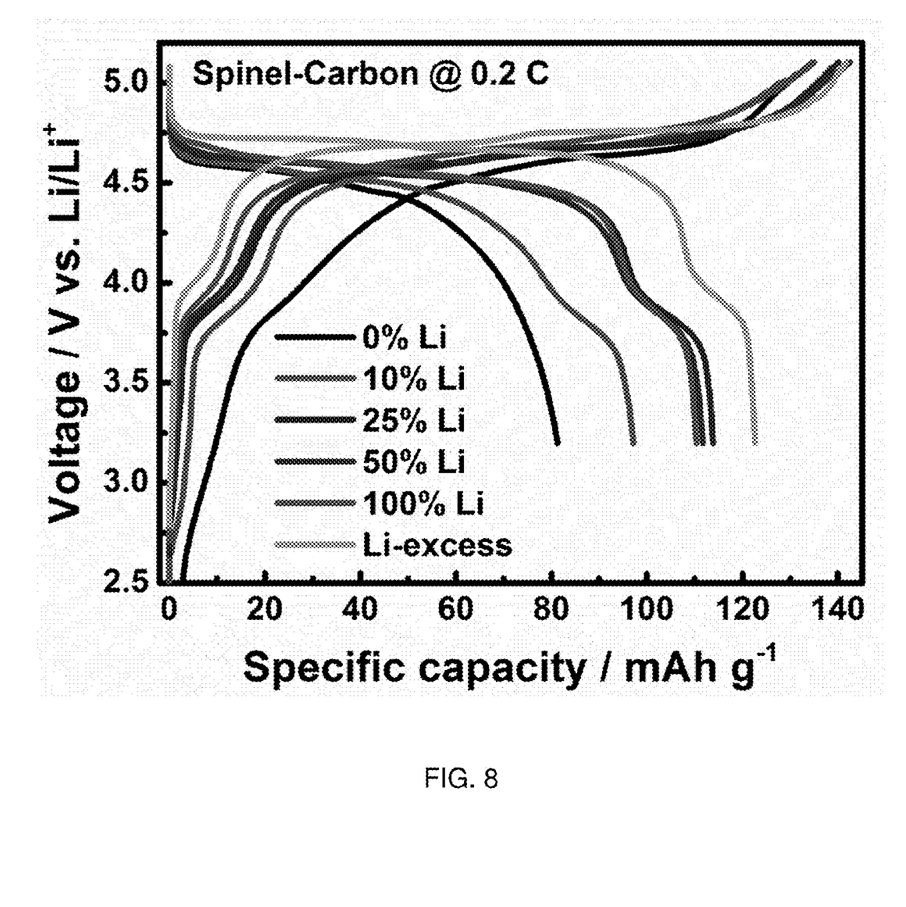
FIG. 8 is a graph of voltage (V vs $Li/Li^+$) versus specific capacity, showing the charge/discharge profiles of exemplary full cells with different amounts of lithium metal provided for compensation.
Figure 9:
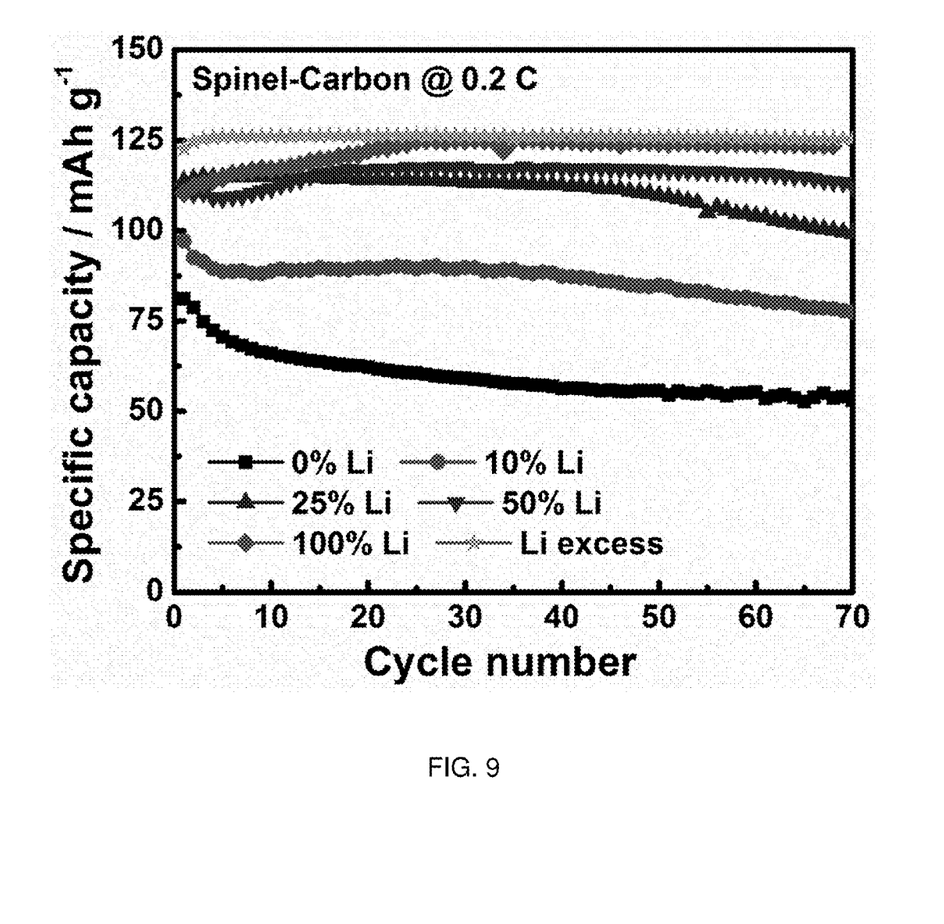
FIG. 9 is a graph of specific capacity versus cycle number, showing the specific capacities of exemplary full cells with different amounts of lithium metal provided for compensation.

Two full cells were assembled, both with anode assemblies comprising a copper foil anode current collector, and a graphite anode, which was attached to one side of the current collector. The graphite anode was prepared by coating a slurry comprised of graphite anode material (80 wt %), conductive additive (10 wt %) and PVDF binder (10 wt %) onto a copper foil. One anode assembly further comprised a lithium foil, pressed onto the side of the anode current collector that did not have the anode attached. Note, though in this embodiment the lithium foil (or metal piece or sheet) was directly attached to the anode current collector without adhesives or binders, in certain embodiments the lithium foil or metal piece or sheet is attached utilizing an adhesive layer or binder or other suitable attachment means. This is not, however, to indicate that embodiments using an adhesive or other attachment means are equivalent to embodiments without such attachment means. There was no direct, physical contact between the anode and the lithium foil. The two cells had identical cathode $LiNi_{0.5}Mn_{1.5}O_4$ with 1 molar $LiPF_6$ in EC/DMC 1:2 vol/vol was used the electrolyte. The cathode electrode was prepared by coating a slurry comprised of $LiNi_{0.5}Mn_{1.5}O_4$ cathode material (80 wt %), conductive additive (10 wt %) and PVDF binder (10 wt %) onto an aluminum foil. The cells were run through charge-discharge cycles at C/5 rate and the cycling performance was measured. The initial charge/discharge profiles and the cycling performance are presented in FIGS. 8 and 9 respectively. The percentages of lithium in FIGS. 8 and 9 refer to the amount of lithium added to the cell in the lithium compensation layer relative to the amount of lithium ions calculated to fully lithiate the graphite anode, based on the mass and the theoretically capacity of the graphite anode.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A device, comprising:
a lithium battery full cell, comprising
a cathode;
a separator;
an anode current collector having a first surface and a second surface;
an anode located on the second surface of the anode current collector;
a lithium compensation layer located on the first surface of the anode current collector; and
wherein there is an absence of direct physical contact between the anode and the lithium compensation layer.

2. The device of claim 1, wherein the lithium compensation layer is in direct physical contact with the first surface of the anode current collector.

3. The device of claim 1, wherein the anode is in direct physical contact with the second surface of the anode current collector.

4. The device of claim 1, wherein there is an absence of direct physical contact between the lithium compensation layer and the second surface of the anode current collector.

5. The device of claim 1, wherein the lithium compensation layer comprises lithium foil.

6. The device of claim 1, wherein the lithium compensation layer is deposited by a method selected from plating, chemical solution deposition, spin coating, chemical vapor deposition (CVD), physical vapor deposition (PVD), atomic layer deposition, thermal evaporation, electron beam evaporation, molecular beam epitaxy, sputtering (DC, rf, magnetron), pulsed laser deposition, cathode arc deposition, electrohydrodynamic deposition, atmospheric pressure CVD (APCVD), low-pressure CVD (LPCVD), ultrahigh vacuum CVD (UHVCVD), microwave assisted CVD (MACVD), plasma-enhanced CVD (PECVD) or metal-organic CVD (MOCVD), closed space sublimation (CSS), closed spaced vapor transport (CSVT), liquid deposition, ink-jet deposition, slot die coating, capillary coating, or a combination thereof.

7. The device of claim 1, wherein the anode comprises graphite, $Li_4Ti_5O_{12}$, silicon, tin, tin alloy, silicon alloy, silicon oxide, lithium alloy, tin oxide, zinc oxide, iron oxide, cobalt oxide, nickel oxide, germanium, graphene, activated carbon, carbon nanotubes, silicon/boron carbide/graphite composite, or combinations thereof.

8. The device of claim 1, wherein the lithium compensation layer has a preselected mass value selected to substantially compensate for lithium ion loss during use of the device.

9. The device of claim 1, wherein the cathode comprises a high-voltage cathode.

10. The device of claim 9, wherein the high-voltage cathode comprises $LiNiO_2$, $LiNi_{1/3}Co_{1/3}Mn_{1/3}O_2$, $LiNi_{0.5}Mn_{1.5}O_4$, $LiNi_{0.5-x}Cr_xMn_{1.5}O_4$, $LiNi_{0.5-x}Co_xMn_{1.5}O_4$, $LiNi_{0.5-x}Al_xMn_{1.5}O_4$, $LiNi_{0.5-x}Fe_xMn_{1.5}O_4$, $LiNi_{0.5}Mn_{1.5}O_{4-z}F_z$ or combinations thereof, x is from greater than 0 to less than 0.5, and z is from 0 to less than 4.

11. The device of claim 1, wherein the anode comprises a high-capacity silicon anode.

12. A device, comprising:
a lithium battery full cell, comprising
a high-voltage cathode;
a separator;
an anode current collector having a first surface and a second surface;
a lithium compensation layer in direct physical contact with the first surface of the anode current collector; and
an anode in direct physical contact with the second surface of the anode current collector, and not in direct physical contact with the lithium compensation layer.

13. The device of claim 12, wherein the high-voltage cathode comprises $LiNiO_2$, $LiNi_{1/3}Co_{1/3}Mn_{1/3}O_2$, $LiNi_{0.5}Mn_{1.5}O_4$, $LiNi_{0.5-x}Cr_xMn_{1.5}O_4$, $LiNi_{0.5-x}Co_xMn_{1.5}O_4$, $LiNi_{0.5-x}Al_xMn_{1.5}O_4$, $LiNi_{0.5-x}Fe_xMn_{1.5}O_4$, $LiNi_{0.5}Mn_{1.5}O_{4-z}F_z$ or combinations thereof, x is from greater than 0 to less than 0.5, and z is from 0 to less than 4.

14. The device of claim 12, wherein the lithium compensation layer comprises lithium foil.

15. The device of claim 12, wherein the lithium compensation layer is deposited by a method selected from plating, chemical solution deposition, spin coating, chemical vapor deposition (CVD), physical vapor deposition (PVD), atomic layer deposition, thermal evaporation, electron beam evaporation, molecular beam epitaxy, sputtering (DC, rf, magnetron), pulsed laser deposition, cathode arc deposition, electrohydrodynamic deposition, atmospheric pressure CVD (APCVD), low-pressure CVD (LPCVD), ultrahigh vacuum CVD (UHVCVD), microwave assisted CVD (MACVD), plasma-enhanced CVD (PECVD) or metal-organic CVD (MOCVD), closed space sublimation (CSS), closed spaced vapor transport (CSVT), liquid deposition, ink-jet deposition, slot die coating, capillary coating, or a combination thereof.

16. A device, comprising:
a lithium battery comprising
an anode current collector having a first surface and a second surface;
a lithium compensation layer in direct physical contact with the first surface of the anode current collector; and
an anode in direct physical contact with the second surface of the anode current collector, and not in direct physical contact with the lithium compensation layer.

17. The device of claim 16, wherein the lithium compensation layer comprises lithium foil.

18. The device of claim 16, wherein the lithium compensation layer is deposited by a method selected from plating, chemical solution deposition, spin coating, chemical vapor deposition (CVD), physical vapor deposition (PVD), atomic layer deposition, thermal evaporation, electron beam evaporation, molecular beam epitaxy, sputtering (DC, rf, magnetron), pulsed laser deposition, cathode arc deposition, electrohydrodynamic deposition, atmospheric pressure CVD (APCVD), low-pressure CVD (LPCVD), ultrahigh vacuum CVD (UHVCVD), microwave assisted CVD (MACVD), plasma-enhanced CVD (PECVD) or metal-organic CVD (MOCVD), closed space sublimation (CSS), closed spaced vapor transport (CSVT), liquid deposition, ink-jet deposition, slot die coating, capillary coating, or a combination thereof.

* * * * *